United States Patent [19]

Pemsler et al.

[11] Patent Number: 4,592,973

[45] Date of Patent: Jun. 3, 1986

[54] SUPPORTED LIQUID MEMBRANE ELECTROCHEMICAL SEPARATORS

[75] Inventors: J. Paul Pemsler, Lexington; Michael D. Dempsey, Revere, both of Mass.

[73] Assignee: Castle Technology Corp., Woburn, Mass.

[21] Appl. No.: 730,251

[22] Filed: May 3, 1985

Related U.S. Application Data

[63] Continuation of Ser. No. 539,125, Oct. 5, 1983, abandoned.

[51] Int. Cl.$^4$ ............................................. H01M 6/04
[52] U.S. Cl. .................................... 429/206; 429/249
[58] Field of Search ............... 429/249, 254, 253, 206

[56] References Cited

U.S. PATENT DOCUMENTS

| | | | |
|---|---|---|---|
| 3,806,369 | 4/1974 | Dey et al. | 136/6 LN |
| 4,086,405 | 4/1978 | Gadessaud | 429/249 X |
| 4,192,725 | 3/1980 | Dotson et al. | 204/98 |
| 4,310,608 | 1/1982 | Dodin et al. | 429/131 |
| 4,396,687 | 8/1983 | Kummer et al. | 429/19 |
| 4,430,398 | 2/1984 | Kujas | 429/206 |

Primary Examiner—Charles F. LeFevour
Attorney, Agent, or Firm—Pahl, Lorusso & Loud

[57] ABSTRACT

Supported liquid membrane separators improve the flexibility, efficiency and service life of electrochemical cells for a variety of applications. In the field of electrochemical storage, an alkaline secondary battery with improved service life is described in which a supported liquid membrane is interposed between the positive and negative electrodes. The supported liquid membranes of this invention can be used in energy production and storage systems, electrosynthesis systems, and in systems for the electrowinning and electrorefining of metals.

11 Claims, No Drawings

SUPPORTED LIQUID MEMBRANE ELECTROCHEMICAL SEPARATORS

The Government has rights in this invention pursuant to Subcontract No. 4521910 under Contract No. DE-AC03-76SF00098 awarded by the U.S. Department of Energy.

This application is a continuation of Ser. No. 06/539,125 filed Oct. 5, 1983 and now abandoned.

SUMMARY OF THE INVENTION

This invention provides a novel separator for use in various types of electrochemical systems. The separator is a supported liquid membrane (SLM) comprising a microporous membrane saturated with a liquid transport medium or agent. The liquid transport medium or agent is a mixture of an organic ionic transporting liquid and a solvent for such liquid, both of which are substantially insoluble in the electrolyte or other system fluids.

A detailed embodiment description is provided in an alkaline secondary battery comprising at least one pair of a positive electrode and a negative electrode and interposed between said electrodes and the alkaline electrolyte is the separator - a supported liquid membrane (SLM).

BACKGROUND

Electrochemical cells play a vital role in today's technology. Major uses include:
- batteries for portable power sources
- electrowinning of metals including aluminum, copper, zinc and nickel
- electrochemical generation of inorganic and organic compounds such as chlorine-caustic and adiponitrile
- fuel cells for direct conversion of fuels to electricity
- electroplating for decoration and corrosion resistance Many electrochemical cells require the presence of a separator between the positive and negative electrodes. The separator serves to prevent the inter-mixing of anolyte and catholyte and/or gaseous reaction products formed at the electrodes. For example, in the electrowinning of copper from cuprous chloride solution, anodes are enclosed in separator bags to prevent the leakage of cupric ($Cu^{2+}$) ions formed in the anodic compartment from reaching the cathodic compartment where they would react with the copper metal deposit, thereby decreasing the current efficiency.

In order for an electrochemical cell to function, one or more ionic species must be transported across the separator to allow for the passage of current. Early separators had no ion specificity and allowed for ionic transport by diffusion of electrolyte fluids. This, of course, resulted in the inter-mixing of anodic and cathodic fluids. Progress in separator technology occurred along two fronts: the development of permselective membranes which discriminated between transport of anions and cations and the development of the microporous separator containing extremely fine pores capable of retarding the flow of larger ions. While both of these approaches provide some advantages, they are far from respresenting the ideal separator. For example, only a few functional groups such as sulfonic acid, carboxylic acid, and alkyl amines have been successfully attached to the polymer structure in a permselective (ion exchange) membrane. Sulfonic and carboxylic acids are cation exchangers with little specificity in discriminating between different cations present in a solution. They have found use in a number of applications where lack of cation discrimination is tolerable. The situation is even less favorable for ion exchangers containing amine functionalities (anion exchangers) since these show instability in many solutions of practical importance and thus have found little commercial use. Additionally, both cation and anion exchange membranes are not impervious to the diffusion of electrolyte and some non-specific transport exists with these membranes.

Microporous separators, as stated above, exhibit discrimination in ion migration as a result of their fine pore size. Again, this discrimination is only qualitative and there remains a significant flow of undesirable ions.

To date, separators for electrochemical processes have been chosen with a compromise in their properties. Low internal resistance requirements suggest that the separator be thin and porous, whereas good separation dictates that the separator be of high selectivity. Overall, the essential properties of a separator for electrochemical applications are (a) adequate chemical stability in the cell environment, (b) high ionic conductivity and (c) low permeability to electrolyte flow.

It is instructive here to discuss several examples of where improved separators for electrochemical cells could lead to significant improvements in technology. Examples are taken from (1) electrowinning, (2) chlor-alkali production and (3) battery separators.

(1) ELECTROWINNING

Electrowinning has long represented a standard for the recovery in highly pure form of certain metals such as nickel, manganese, chromium, zinc and more recently copper from hydrometallurgical operations. A major opportunity exists for the improvement of electrowinning cells in the development of low resistance, highly ion specific separators.

In the electrowinning of copper from cupric ions as would be practiced in a ferric chloride leach such as that developed by the U.S. Bureau of Mines, the cell reactions are $$Cu^{2+} + e^- \longrightarrow Cu^+ \text{ cathode}$$

$$Cu^+ + e^- \longrightarrow Cu^°$$

$$2Cl^- \longrightarrow Cl_2 + 2e^- \text{ anode}$$

In this cell the elemental chlorine generated at the anode is somewhat soluble in the aqueous brine and must be prevented from reaching the cathode compartment where the chlorine would oxidize cuprous ($Cu^+$) ions contained in the catholyte to form cupric chloride, partially shorting out the cell. Various separators (diaphragms) were studied by the Bureau of Mines ranging from the highly permeable asbestos to a tightly woven polypropylene twill. Current efficiencies were generally in the range of 70-85%, and cupric ($Cu^{2+}$) concentrations were kept low, in the range of 2-10 g/l. A better separator would greatly improve the operation by allowing higher copper loadings and achieving higher current efficiencies. The separator should function by transporting $Cl^-$ from the cathode to the anode compartment while preventing the passage of $Cu^{2+}$ from anolyte to catholyte.

A similar situation exists in the electrowinning of $Ni^{2+}$ and $Co^{3+}$ from chloride electrolytes where it is necessary to prevent the passage of chlorine formed at the anode from attacking the metal deposits.

The examples above refer to recovery of metals from chloride containing solutions obtained from hydrometallurgical processes using chloride leaching solutions. An added degree of freedom would exist in chloride hydrometallurgy if it were possible to transfer ions selectively form a chloride solution anolyte to a sulfate catholyte. This would circumvent problems associated with powdery deposits as, for example, is obtained with copper chloride.

The use of a highly selective cation transport separator would allow direct transfer of the desired metal species from a chloride anolyte to a sulfate catholyte while preventing interchange of a chloride, sulfate and unwanted metal species. Such a cell would simultaneously allow:

separation of the metal from impurities in the leach solution.

electrodeposition from the sulfate.

regeneration of $Fe^{3+}$ and/or other oxidizing species at the anode as the depolarizing reaction.

Hydrometallugical treatment of a complex ore or concentrate may produce a pregnant liquor containing several valuable metals, e.g. copper and zinc or nickel and cobalt. The availability of a cell separator that is selective for one of the metals would allow its direct electrochemical recovery without requiring extensive pretreatment of the electrolyte.

There are many other examples of electrowinning processes that would greatly benefit from ion specific, low resistance membranes. These include precious metal recovery, electrolytic manganese where very high solution purity is required, and chromium from chrome alum solutions.

(2) CHLOR-ALKALI PRODUCTION

Another representative area where a low resistance, highly specific electrochemical separator would be of significant benefit is in the chlor-alkali cell. Here brine is electrolyzed to form sodium hydroxide at the cathode and chlorine at the anode. In the older cells, an asbestos diaphragm was used to separate the anode and cathode compartments. This is necessary to separate the chlorine liberated at the anode and the hydrogen and the caustic soda produced at the cathode. Without the diaphragm to isolate them, caustic soda and chlorine would react to form sodium hypochlorite with further reaction to produce sodium chlorite. In diaphragm cells, purified brine is allowed to flow into the anode compartment and percolates through the diaphragm to the cathode chamber. The rate of percolation is controlled by maintaining a higher liquid level in the anode compartment to establish a positive hydrostatic head. Percolation rate is a compromise between a low rate that would produce a desirably high concentration of caustic soda in the catholyte and a high rate which limits the back migration of hydroxyl ions from the catholyte to the anolyte which decreases the cathode current deficiency.

Newer chlor-alkali cells use an ion exchange membrane such as Nafion ® (Du Pont) to separate the anolyte and catholyte. Advantages of this cell are reported to be lower energy consumption, lower operating cost, convenient installation and fewer environmental problems. With Nafion ® membranes, however, the current efficiency at high caustic concentrations was found not to be adequate, and, as the cost of energy began to escalate, the cell became uneconomical. Improvements came with the development of "barrier layer" additions at the catholyte surface to promote higher permselectivity. The Nafion ® 300 series membrane is reported to have commercial value where lower strength sodium hydroxide (15-20wt%) is required, and Nafion ® 227 membrane reportedly can produce sodium hydroxide with higher efficiency in the range 28-30wt%. Other advances were made by Ashai Chemical and Tokuyma Soda in using a barrier layer containing the carboxylate functionality, and Du Pont has reported on Nafion ® 901 membrane which is a high performance sulfonate-carboxylate membrane. Ashai Glass developed a perflorocarboxylate membrane, Flemion, which is currently in use in chlor-alkali plants in Japan.

Performance of all of these membranes represents a compromise between permselectivity and resistivity in that the ability to control the migration of undesirable species is paid for by an increase in resistivity. The operating systems are as yet a long way from an ideal membrane separator which would allow only transport of sodium ions and water molecules. The membrane must exclude the migration of the hydroxyl ion from catholyte to anolyte when the cell is operating in order to retain the high cathodic current efficiencies achieved in the electrochemical decomposition of water molecules. Furthermore, diffusion of sodium chloride and sodium hydroxide across the membrane separator should be close to zero to prevent loss of product into the anolyte and even more importantly, to preserve the purity of the product caustic from contamination by sodium chloride.

(3) NICKEL-ZINC BATTERIES

The nickel-zinc battery which has been under development in recent years for electric vehicle and load-levelling applications is an excellent example of the role that a separator plays in the performance of an electrochemical system. The problems associated with the nickel-zinc battery are due to the solubility of zinc from the zinc electrode in the strong potassium hydroxide electrolyte and the subsequent migration of the soluble zincate species across the separator to the nickel electrode. During charging, zinc dendrites grow from the zinc electrode through the microporous separator, ultimately shorting out against the nickel electrode which leads to cell failure. It is the presence of the zincate ion in the electrolyte in the nickel electrode compartment and in the separator itself which allows for the penetration of the zinc dendrites. A second factor limiting the life of nickel-zinc batteries is the shape change that occurs in the zinc electrode where active material is displaced from the edges of the electrode and accumulates in the center. The attendant reduction in the area of active material results in a decrease in cell capacity with time, to the point where the cell can no longer deliver substantial amounts of current. Investigators have documented the role of the separator in the zinc shape change phenomenon, which appears due to the volumetric flow across the membrane induced by an electroosmotic force and pressure gradients resulting from chemical and electrochemical reactions. Thus, the major problems associated with the nickel-zinc battery may be overcome by use of a suitable separator that would eliminate dendrite shorting and greatly reduce shape change.

In addition to their uses in alkaline batteries, supported liquid membranes (SLM) separators may be useful in rechargeable redox electrochemical cells. The anodic fluid and cathodic fluid must be well separated since cell efficiencies depend greatly on allowing only selective ionic transport. Of particular interest is a cell where the anodic fluid is a chromic/chromous couple and the cathodic fluid is a ferrous/ferric couple. Here the SLM would be chosen to selectively transport Cl⁻ ions from anode to cathode compartments during charge and discharge and prevent transport of chromium, iron and hydrogen ions. In another redox system, the rechargeable alkaline zinc/ferricyanide battery, U.S. Pat. No. 4,180,623, the SLM separator would be used to selectively transport hydroxide (OH⁻) ions, and prevent transport of iron and zinc containing species.

SLM separators may also have great utility in use in halogen batteries such as zinc-bromine and zinc-chlorine where it is desirable to transport the Br⁻ and Cl⁻ ions while excluding transport of other forms of bromine and chlorine respectively.

Fuel cell applications of SLM separators include the hydrogen-bromine fuel cell and the phosphoric acid fuel cell, which currently rely on very expensive membranes such as Nafion ® membranes (DuPont).

SUPPORTED LIQUID MEMBRANE

Supported liquid membranes in novel configurations discussed, can function closer to an ideal separator than any previous separator documented in the literature. Supported liquid membane (SLM) development is an outgrowth of advances in two separate fields:

liquid ion exchange reagents for the extraction of cations and anions.

microporous membranes for biological transport, battery separators and other uses.

Liquid ion exchangers are water insoluble organic complexing agents dissolved in a water insoluble organic solvent such as kerosene or benzene. They offer great selectivity, flexibility and economy in hydrometallurgical processing. Both cation exchange reagents such as oximes and high molecular weight acids and anion exchange reagents such as high molecular weight amines and quaternary ammonium salts are in hydrometallurgical use. An aqueous stream containing one or more ions to be separated and/or concentrated is mixed with an organic solvent containing the ion exchanger. Chemical ion exchange takes place between organic and aqueous phase according to the general reactions

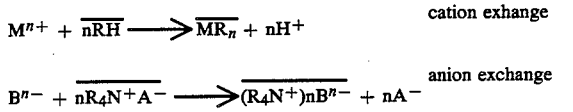

where RH is a cation exchange reagent, R₄N⁺ is an alkyl ammonium anion exchanger and the bars denote the organic phase. After mixing, the organic and aqueous phases are allowed to disengage in a settler and the loaded organic phase containing the metal of interest is separated from the metal depleted aqueous phase. The organic phase is then contacted with a suitable stripping agent, usually strong acid or base, which removes and concentrates the metallic ions of interest and regenerates the liquid extractant. Remarkable selectivity and concentrating ability has been achieved for both cations and anions by judicious choice of extractant-solvent systems. Unlike solid ion exchange membranes where functional groups must be chemically bonded to the rigid polymer, a very wide choice of extractants exists.

A supported liquid membrane consists of a transport agent which may be a liquid ion exchange/solvent system infused into the pores of a hydrophobic microporous membrane such as the Celgard ® 2000 (Celanese Corp.) series polypropylene films, the Poroplastic ® (Moleculon Research Corp.) cellulose triacetate films and Goretex ® (W. L. Gore and Associates) polytetrafluoroethylene films. Liquid contents as high as 98 volume % have been achieved but are more typically 40–70 volume %. The resulting membrane can be thought of as consisting of two interpenetrating and largely independent phases: one component is a strong, stable resin microporous film or membrane and the other component is a transport agent which may be a liquid ion exchange reagent. Diffusion rates within the membrane are high, approaching that of ordinary liquid diffusion and ionic transport proceeds rapidly. Since the membranes used are hydrophobic, there is virtually no loss of organic (leakage) from the membrane. Supported liquid membranes are insensitive to normal shaking and vibration since the organic phase is held in the microporous host films by strong surface tension forces.

A desirable feature of SLM separators is that they are inherently low in cost. Since the volume of organic liquid contained in the microporous film support is so small (about 1 cm³/ft²), even with an expensive organic transport agent, the cost of the separator is only slightly greater than the cost of the microporous support alone. This also means that most chemicals used in analytical chemical extractions, hydrometallurgy and chemical processing can be considered for use as a component of the liquid transport agent to be used in supported liquid membranes.

The term liquid transport agent or liquid transport medium as used herein is intended to mean an organic compound or mixture of organic compounds insoluble in electrochemical cell solutions and when substantially filling the pores of separator materials permits the ionic transport of selected ionic species while substantially preventing the transport or diffusion of other ionic species across or through the separator material.

Although the novel supported liquid membrane separator described herein has wide application in the areas of electrowinnning of metals, chlor-alkali production, fuel cells, and electroplating it is to be understood that the description below relating to the use of the supported liquid membrane as battery separators is for illustrative purposes only and not a limitation on the scope of the applicability of the supported liquid membrane separators.

The invention is illustrated as applied to alkaline secondary batteries which includes nickel-zinc, nickel-cadmium, silver-zinc, nickel-iron and zinc-ferricyanide secondary batteries. More particularly the supported liquid membrane separator as it relates to a zinc alkaline secondary battery having improved service life in which a supported liquid membrane comprising a microporous membrane saturated with a liquid transport medium is interposed between the positive and negative electrodes.

An alkaline battery accordingly includes negative electrode preferably of the type used in ordinary zinc alkaline secondary battery. The negative electrode may be made from 80% by weight of zinc oxide powder, 10% by weight of zinc powder, 5% by weight of cadmium oxide powder and 5% by weight of polytetrafluoroethylene dispersion in a usual manner. The positive electrode may be a standardized sintered nickel positive electrode. Other electrode combinations that may be used within the scope of this invention include but are not limited to nickel-cadmium systems, silver-zinc systems and nickel-iron systems. Thus the novel supported liquid membrane separator has general applicability to all alkaline secondary battery systems.

In preparing the battery the cathode is wrapped or encased in an absorbant wrap, hereinafter sometimes referred to as absorber or wicking material. Any known absorbant wrap may be used but it is preferred to use as absorbant wrap of nonwoven type capable of absorbing sufficient amount of electrolyte. The absorber material is saturated with a selected electrolyte and wrapped around the cathode. The preferred electrolyte is an aqueous solution of de-ionized water containing from about 23 weight percent (about 5.0 molar) to about 35 weight percent (about 8.0 molar) potassium hydroxide. If desired the electrolyte may also contain a small amount, i.e. about 1.0 weight percent, of lithium hydroxide as an additive.

The cathode encased in the electrolyte saturated absorbant wrap is then wrapped in a supported liquid membrane (SLM) comprising a liquid transport agent saturated microporous membrane. By a saturated microporous membrane we mean one whose pore structure is substantially filled with organic transport agent solution. The membrane is any hydrophobic microporous material inert to the battery environment and having an overall porosity ranging from about 98% to about 10% or lower, preferably between about 30 to 65% porosity. The thickness of the microporous membrane will be from about 0.5 mil to about 25 mils and preferably between about 1 and 3 mils thick. The thickness of the membrane is not critical so long as the resistivity of the membrane when saturated with the liquid transport agent is less than about 100 ohm-$cm^2$. Preferably the resistivity of the membrane will be of the order of 10 ohm-$cm^2$ or lower for slow discharge batteries and of the order of 1 ohm-$cm^2$ or lower for more rapid discharge batteries. Other various combinations of absorbant wrap layers may be used so long as there is at least one layer of a supported liquid membrane between the electrolyte saturated absorbant wrap and the electrodes. The nature of the supported liquid membrane is such that it allows the transport of the desired ionic species, i.e. the hydroxyl ion, through the supported liquid membrane but does not permit significant flow of other ions such as zincate or other electrode reaction products to be transported across or through the membrane thickness. In other words the supported liquid membrane acts as a total barrier to penetration and growth of dendrites by preventing any appreciable supply of zinc-containg species from entering the membranes. Also, it serves to separate other ionic species from crossing from anode to cathode compartments and vice versa.

The absorbant wrap material may be selected from a variety of well known materials now used in battery manufacturing. The earliest absorbant materials were cellulosic in nature. Later, resin-bonded papers and polyamide type synthetic fiber materials were in widespread use. Characteristics of typical absorbers and nonwoven fabrics appears in Table I.

TABLE I

| EXAMPLES OF ABSORBANT WICK MATERIALS ||||||
|---|---|---|---|---|---|
| Material | Code | Source | Approx. Thickness mm | Approx. Weight, g/$m^2$ | Common Use |
| Cotton | M1165 | A | 0.22 | | Mercury cells |
| Nylon | FT2100 | C | 0.22 | 60 | Nickel-cadmium cells |
| Polypropylene | FT2140 | C | 0.16 | 67 | Nickel-cadmium silver zinc cells |
| Dynel | EM403 | A | 0.02 | 17 | Underwrap in silver-zinc cells |
| Polypropylene | EX635 | B | 0.025 | | Nickel-cadmium cells |
| Asbestos paper | Quinteria | D | 0.09 | 65 | High temperature uses |
| Nylon-Dynel | EM312 | A | | | |
| Cotton | R2201 | A | 0.063 | 26 | Mercury and other cells |
| Cellulose rayon paper | Viskon | E | 0.09 | 22 | Underwrap in silver-zinc cells |
| Cellulose nylon paper | Syntosil 50/50 | F | 0.27 | 90 | Nickel-cadmium |
| Dynel material | D3H | G | 0.16 | 77 | |

A: Kendall Co.
B: American Felt Co.
C: Pellon Corporation
D: Johns Manville Co.
E: Chicopee Mills Inc.
F: Zurich Paper Mills
G: The Felters Co.

Other absorbant polypropylene materials include Pellon 2121, Pellon 2107 (Pellon Corp.); S-52114, S-54259 (Kimberly Clark Corp.); Webril M 1003, Novonette SP (Kendall Corp); and Permion A-1480 (RAI Research Corp.). Nylon materials include Pellon 2502 - Pellon Corp. and Novonette 149-00 (Kendall Corp.).

The microporous membrane or film used in the supported liquid membrane (SLM) is a heterogenous material containing small pores in a continuous film matrix. Membranes that may be used in the alkaline cells can be made from natural materials, modified natural materials or completely synthetic materials so long as they are hydrophobic and inert in the alkaline cell environment. They can be porous semipermeable films, but more desirably microporous films. Examples of membranes are presented in Table II. In addition to the listed membranes, composites made of two or more of the above may function as the host material for the transport agent in an SLM.

TABLE II
TYPICAL CHARACTERISTICS
OF SOME MICROPOROUS PLASTICS AND SEMIPERMEABLE MEMBRANES
(In 30–40% KOH Solutions)

| Base Material | Trade Name | Source | Approximate Dry Thickness (mm) | Approximate Pore Diameters (A) | Porosity (%) | Approximate Dry Weight (g/cm$^2$) |
|---|---|---|---|---|---|---|
| A. Microporous Films | | | | | | |
| Polyethylene | Porothene 5/1 | A | 0.065 | 10,000–15,000 | 60–80 | 0.002 |
| Polyethylene | Porothene S | A | 0.065 | 10,000–20,000 | 75–85 | 0.002 |
| PVC | Synpor | A | 0.15 | 5,000–7,000 | 60–70 | 0.004 |
| PVC | Porvic I | B | 0.50 | 2,000–4,000 | 60–80 | 0.03 |
| Dynel | Polypor WA | C | 0.079 | 1,000–4,000 | 60–70 | 0.004 |
| Dynel | Acropor WA | D | 0.110 | 1,000–5,000 | 60–75 | 0.005 |
| Polypropylene | Celgard 2400 | H | 0.025 | 200 | 38 | .001 |
| Polypropylene | Celgard 2500 | H | 0.025 | 400 | 45 | .001 |
| Polytetrafluroethylene | Gore Tex | I | 0.060–0.076 | 200–10,000 | 50–91 | — |
| Polytetrafluroethylene | Gore Tex | I | 0.012–0.025 | 30,000–150,000 | 95–98 | — |
| Polysulfone | GT-200-CC | D | 0.076 | 1,000–15,000 | 80 | — |
| PVC Copolymer | Metricel-DM | D | 0.015 | 4,500–8,000 | — | — |
| Polyvinyl Chloride | Metricel-VM | D | 0.015 | 5,000 | — | — |
| Nylon | M8PL | J | 0.050 | 10,000 | — | — |
| B. Semipermeable Films | | | | | | |
| Cellophane | 193-PUD-O (formerly PUDO-300) | E | 0.025 | 25–30 | >90 | 0.0035 |
| Cellophane | 134-PUD-O (formerly PUDO-600) | E | 0.041 | 25–30 | >90 | 0.0050 |
| Reinforced Cellophane | Fibrous sausage casing | F | 0.086 | 25–35 | 80–90 | 0.008 |
| Modified Cellophane | Permion 600 | G | 0.064 | 60–90 | 50–60 | 0.049 |
| Modified Polyethylene | Permion 300 | G | 0.028 | 60–80 | 50–70 | 0.031 |
| Acrylic Impregnated Porothene | PMA 83/17 | A | 0.037 | 20–30 | 40–60 | 0.005 |

SOURCES FOR TABLE II
A ESB Inc., Philadelphia, PA
B EPS, Ltd., London, England
C Polytechnic Institute of Brooklyn, NY
D Gelman Industries, Ann Arbor, MI
E E. I. DuPont, de Nemours, Wilmington, DE
F Visking Division, Union Carbide, New York, NY
G R.A.I., Long Island City, NY
H Celanese Corp., Summit, NJ
I W. L. Gore and Associates, Elkton, MD
J Membrana, Inc., Pleasanton, CA As defined above the supported liquid membrane is a microporous membrane saturated with a mixture of a transport agent dissolved in a suitable solvent-modifier. The transport agent is selected to permit ionic transport through the pores of the microporous membrane but to substantially inhibit movement of any other liquid or electrode reaction products that are present in the battery environment through the supported liquid membranes. We have discovered several broad classes of transport agents that may be used within the scope of this invention. These broad classes include primary, secondary and tertiary amines, quaternary ammonium salts, phosphoric acids, phosphonates, phosphine oxides, acid phosphinates, quaternary phosphonium salts, β diketones, sulfonic acids, crown ethers, other polyethers, hydroxy oximes and mixtures of these transport agents. All these classes of transport agents are substantially insoluble or have low solubility in the electrolyte used in alkaline secondary batteries.

Specific suggested transport agents are listed, but not limited to, those given below: The primary amines such as the trialkylmethylamines (Primene JMT, Rohm and Haas Corp.) where the alkyl groups have a total of 18–24 carbon atoms.

The secondary amines such as docenyl-n-trialkylmethylamine (Amberlite LA-1, Rohm and Hass Corp.), where the alkyl groups have a total of 24–27 carbon atoms, and n-lauryl-n-trialkylmethylamine (Amberlite LA-2, Rohm and Hass Corp.) where the alkyl groups have a total of 24–27 carbon atoms.

The tertiary amines such as triisooctylamine, trialkylamine where the alkyl groups have 8 carbon atoms (Alamine 336, Henkel Corporation), and N,N-didocenyl-N-n-butylamine (Amberlite XE-204, Rohm and Haas Corp.).

The quaternary amines such as trialkylmethylammonium chloride (Aliquat 336, Henkel Corp.) where the alkyl groups have 8 or 10 carbon atoms and t-butylammonium chloride.

The carboxylic acids such as Naphthenic acid (Shell Corp. Chemical Co. Ltd.) and Versatic acid (Shell Corp. Chemical Co. Ltd.).

The phosphoric acids such as monodecyl phosphoric acid, mono heptyldecyl phosphoric acid and di(2-ethylhexyl) phosphoric acid.

The phosphonates such as dibutylbutyl phosphonate, diisoamylmethyl phosphonate and di(2-ethylhexyl) phenyl phosphonate.

The acid phosphates such as 2-ethylhexylphenyl phosphoric acid and chloromethylphenyl phosphoric acid.

The phosphine oxides such as tributylphosphine oxide and trioctylphosphine oxide.

The acidic phosphinates such as di-n-octyl phosphinic acid and cyclooctylphenyl phosphinic acid.

The quaternary phosphonium salts such as t-butylphosphonium chloride.

The $\beta$ diketones such as acetylacetone and benzoylacetone.

The sulfonic acids such as dinonylnapthalene sulfonic acid and didodecylnaphthalene sulfonic acid.

The crown ethers such as 18-crown-6, 15-crown- 5, dibenzo-18-crown-6 and dicyclohexano-18-crown-6 ethers and the acyclic polyethers such as polyethylene glycol dimethyl ether.

The hydroxy oximes such as 5, 8 diethyl-7 hydroxydodeca-6-oxime (LIX 63, Henkel Corp.), 2-hydroxy-5-nonylbenzophenone oxime (LIX 65, Henkel Corp.), 2-hydroxy-5-nonylacetophenone oxime (SME 529, Shell Chemical Ltd), and 5-nonyl salicaldoxime (P-5300, Acorga Ltd).

Suitable modifiers that may be used within the scope of this invention include many organic compounds that are substantially insoluble or have low solubility in the battery electrolyte, are polar in nature and in which the transport agent is soluble. The solvent may also be a mixture of organic materials having these characteristics. Suggested solvent-modifiers include n, 2, or 3 hexanol ($C_6H_{14}O$); n, 2, 3 or 4 heptanol ($C_7H_{16}O$); n-octanol (capryl alcohol) - ($C_6H_{18}O$); n-decanol ($C_{10}H_{22}O$); cyclohexanol ($C_7H_{12}O$); phenethyl alcohol ($C_8H_{10}O$); and benzyl alcohol ($C_7H_8O$). These modifiers include the above and also when mixed in suitable proportions with solvents such as benzene, toluene, kerosene, decane, etc.

We have found that the polar organic compound modifier plays a vital role in the transport of hydroxyl ions. Thus, in some cases, virtually no transport across the SLM occurs when the transport agent is dissolved in solvents such as benzene, decane, etc. Only when the polar modifiers and the transport agent are included in the organic solution does hydroxyl ion transport occur within the SLM. This mixture is necessary to achieve a usable separator of adequately low resistivity for use in electrochmical applications such as batteries. Since the polar compound modifier plays a vital role in the transport process, it may be asserted, without predjudice as to the transport mechanism that operates in this invention, that the modifier also acts as an ion transport medium but only in the presence of the transport agent.

In order for the SLM separator to function properly, it must be of sufficiently low resistance. The resistance of the SLM separator depends, in a complex manner, on the composition and concentration of the transport agent and modifier in the SLM and the composition and concentration of the electrolyte. Thus, the choice of separator constituents should be optimized for the particular electrochemical cell application.

For a battery, this means that the resistance must be low enough to allow for the required current demand. For batteries used in relatively low current drain applications, the separator resistance can be significantly higher than for batteries used in high rate discharge applications. For example, in the nickel-zinc battery used at low discharge rates, a separator resistance of about 10 ohm-$cm^2$ would be acceptable, whereas in a high rate application, separator resistances in the range 0.1–1 ohm-$cm^2$ would be required.

We have shown, that in order to obtain sufficiently low resistances, proper combinations of transport agents and modifiers must be used. Table III below shows the resistance of membranes prepared with several transport agents, solvents and modifiers.

TABLE III

EXAMPLES OF SUPPORTED LIQUID MEMBRANE SEPARATOR RESISTANCE

| Transport Agent | Concentration Weight | Polar Modifiers | Membrane Support | KOH Electrolyte Molarity | Separator Resistance ohm $cm^2$ |
|---|---|---|---|---|---|
| di(2-ethylhexyl) phosphoric acid | 20% | 80% Cyclohexanol | Celgard 2500 | 5.0 | 1.3 |
| di(2-ethylhexyl) phosphoric acid | 75% | 25% Cyclohexanol | Celgard 2500 | 5.0 | 1.8 |
| di(2-ethylhexyl) phosphoric acid | 20% | 16% Benzyl alcohol 64% Cyclohexanol | Celgard 2500 | 5.0 | 2.4 |
| dicyclohexano 18-crown-6 ether di(2-ethylhexyl) phosphoric acid | 20% 10% | 70% Cyclohexanol | Celgard 2500 | 5.0 | 3.0 |
| 18-crown-6 ether | 7% | 93% Cyclohexanol | Celgard 2500 | 7.0 | 16.0 |
| 18-crown-6 ether | 7% | 93% Decanol | Celgard 2500 | 7.0 | 137.0 |
| 18-crown-6 ether | 20% | 80% Cyclohexanol | Celgard 2500 | 7.0 | 7.0 |
| 18-crown-6 ether | 20% | 80% n-hexanol | Celgard 2500 | 7.0 | 21.6 |
| 18-crown-6 ether | 25% | 75% Cyclohexanol | Gelman HT-200-CC | 7.0 | 11.4 |
| dicyclohexano 18-crown-6 ether | 20% | 80% Phenethyl hexanol alcohol | Celgard 2500 | 7.0 | 30.0 |
| dicyclohexano 18-crown-6 ether | 10% | 90% Cyclohexanol | Celgard 2500 | 7.0 | 54.0 |
| dinonyl naphthalene sulfonic acid | 20% | 80% Cyclohexanol | Celgard 2500 | 5.0 | 0.4 |
| dinonyl naphthalene sulfonic acid | 20% | 80% Cyclohexanol | 1 mil Goretex | 5.0 | 0.5 |
| Aliquat 336 Henkel Corp. | 8% | 92% Cyclohexanol | Celgard 2500 | 7.0 | 60.0 |
| Aliquat 336 Henkel Corp. | 20% | 80% Cyclohexanol | Celgard 2500 | 7.0 | 38.0 |
| Aliquat 336 Henkel Corp. | 20% | 80% Cyclohexanol | Celgard 2500 | 5.0 | 1.0 |

TABLE III-continued
EXAMPLES OF SUPPORTED LIQUID MEMBRANE SEPARATOR RESISTANCE

| Transport Agent | Concentration Weight | Polar Modifiers | Membrane Support | KOH Electrolyte Molarity | Separator Resistance ohm cm$^2$ |
|---|---|---|---|---|---|
| Aliquat 336 Henkel Corp. | 20% | 64% Cyclohexanol 16% Benzyl alcohol | Celgard 2500 | 7.0 | 96.0 |
| t-butyl ammonium hydrogen sulfate | 8% | 92% Cyclohexanol | Celgard 2500 | 7.0 | 82.0 |
| t-butyl ammonium hydrogen sulfate | 8% | 92% n-hexanol | Celgard 2500 | 7.0 | 23.0 |
| t-pentyl ammonium bromide | 9% | 91% Cyclohexanol | Celgard 2500 | 7.0 | 44.0 |
| t-pentyl ammonium bromide | 20% | 80% n-hexanol | Celgard 2500 | 7.0 | 29.0 |
| t-butyl phosphonium chloride | 7% | 93% Cyclohexanol | Celgard 2500 | 7.0 | 62.0 |
| cetyl trimethyl ammonium bromide | 9% | 91% Cyclohexanol | Celgard 2500 | 7.0 | 55.0 |
| polyethylene glycol dimethyl ether | 10% | 90% Cyclohexanol | Celgard 2500 | 7.0 | 88.0 |
| Versatic Acid (Shell Chemical Co. Ltd.) | 20% | 80% Cyclohexanol | Celgard 2500 | 7.0 | 114.0 |

Suitable supported liquid membranes for use in industrial processes include the following:

A supported liquid membrane suitable for the electrowinning of copper from a cuprous chloride solution would be prepared by infiltrating a Celgard 2500 (Celanese Corp.) membrane film with a solution of 20% tricaprylmethyl ammonium chloride (Aliquat 336 - Henkel Corp.).

A supported liquid membrane suitable for electroplating copper from an electroplating bath containing various platable impurities in the anolyte and a catholyte of copper sulfate and sulfuric acid where the acidity is maintained at a pH of about 0.5, would be prepared by infiltrating a Celgard 2500 membrane film with a solution of 20% P5300 (5-nonyl salicaldoxime, Acorga Ltd.).

A supported liquid membrane suitable for use in a chlor-alkali cell would be prepared by infiltrating a Goretex microporous polytetrafluoroethylene (W. L. Gore and Associates) membrane film with a solution of 20% dinonylnaphthalene sulfonic acid.

Transport rate measurements indicate that the SLM's provide high degree of selectivities. For example, in the electrolyte used in a nickel-zinc battery, i.e. 35% KOH - 1% LiOH saturated with zincate ion, the $OH^-$ transport rate through representative SLM's is about $10^{-6}$ to $10^{-7}$ moles cm$^{-2}$ sec$^{-1}$ while that of zincate is about $10^{-12}$ to $10^{-13}$ moles cm$^{-2}$ sec$^{-1}$. There is, then, a selectivity for $OH^-$ transport over zincate transport of about 1 million to one.

The following specific examples are illustrative but not limitative of the invention, it being understood that similar improved results are obtainable with other combinations of the different ingredients. All such variations which do not depart from the basic concept of the invention and materials disclosed above are intended to come within the scope of the appended claims.

EXAMPLE 1

A Ni-Zn battery was assembled using a supported liquid membrane. Celgard 2500 (Celanese Corporation) polypropylene film supplied by Celanese Corporation was used as the microporous membrane support. The membrane had a porosity of about 45%, an effective pore size of about 400 angstroms and a nominal thickness of about 1 mil. The liquid transport agent was a solution of 20 weight % 18-crown-6 ether and 80 weight % cyclohexanol. The supported liquid membrane separator was prepared in place on the zinc electrode.

The electrode was enclosed in an absorbant wrap such as Pellon (Pellon Corp.). The absorbant wrap was heat sealed and trimmed at all four edges of the rectangular electrode. The absorbant wrap was wet with a 35 weight % KOH-1 weight % LiOH electrolyte solution. The wicked electrode was wrapped in a single layer of supported liquid membrane heat sealed and trimmed at the edges. The supported liquid membrane was then allowed to absorb the liquid transport agent for a period of 2 minutes or until all surfaces of the support film turned from opaque white to clear indicating substantial saturation.

The encased zinc electrode was then placed into a flat plate configuration laboratory test cell with Ni as the other electrode and filled with electrolyte. Nominal capacity of the cell was 0.34 Amp-hours. The assembled cell was cycled at constant current using a discharge rate of 3 hours and a charging rate of 5 hours to 100% of discharge capacity. The cycle life of the cell was 70 cycles. Upon disassembly no zinc dendrite shorts were found.

A comparable cell using one layer of a Celgard separator material without the liquid transport agent, under identical conditions, failed due to dendrite shorting in less than 10 cycles.

EXAMPLE 2

The procedure outlined in Example 1 was followed except that the liquid transport agent was a solution of 7 weight % tetrabutylphosphonium chloride and 93 weight % cyclohexanol. The cell, cycled at the same rates, achieved a cycle life of 151 cycles with no dendrite shorting.

EXAMPLE 3

The supported liquid membrane described in Example 1 was utilized. The zinc electrode was first wrapped in Pellon (an absorbant wrap) then wet with the electrolyte. One layer of Permion P-700 film (RAI Research Corp.) was heat sealed and trimmed to the edges of the absorbant wrapped zinc electrode. The Permion P-700 film is a copolymer of methacrylic acid and low density polyethylene film manufactured using a radiation grafting process by RAI Research Coporation. The electrode was then wrapped with one layer of Celgard 2500 film as the microporous membrane and the supported liquid membrane was formed as detailed in Example 1. Excess transport agent was blotted from the saturated Celgard film with a tissue. The electrode was then wrapped in another single layer of Permion P-700 film.

The wrapped zinc electrode was placed in a flat plate laboratory test cell between two Ni electrodes. Nominal capacity of this cell was 0.88 Amp hours. The cell was cycled at constant current with a complete discharge for 2 hours and a 4 hour charge at 120% of discharge capacity. Cycle life of the cell was 222 cycles. Upon disassembly no zinc dendrites were found penetrating the supported liquid membrane.

EXAMPLE 4

The procedure of Example 3 was followed utilizing a 20 weight % di(2-ethylhexyl) phosphoric acid - 80 weight % cyclohexanol solution as the liquid transport agent. The Ni-Zn battery electrolyte used was 23 weight % KOH - 1 weight % LiOH. Cycle life of the cell was 175 cycles. Upon disassembly no zinc dendrites were found penetrating the supported liquid membrane.

EXAMPLE 5

The procedure of Example 3 was followed utilizing a 20 weight % 18-crown-6 ether/80 weight % hexanol solution as the liquid transport agent. The cycle life of the cell was 102 cycles. Upon disassembly no zinc dendrites were found penetrating the supported liquid membrane.

The terms and expressions which have been employed are used as terms of description and not of limitation, and there is no intention, in the use of such terms and expressions, of excluding any equivalents of the features shown and described or portions therof, but it is recognized that various modifications are possible within the scope of the invention claimed.

Without further analysis, the foregoing will so fully reveal the gist of the present invention that others can by applying current knowledge readily adapt it for various applications without ommitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A separator for use in electrochemical cells, comprising: a hydrophobic microporous membrane; and
a liquid ionic transport agent comprising an organic agent dissolved in an organic solvent supported by a porous matrix of the membrane that selectively transports specific cation or anion species through the membrane while rejecting others, wherein said liquid ionic transport agent is insoluble in the electrochemical electrolyte solution.

2. The separator of claim 1 wherein said electrolyte insoluble liquid ionic transport agent comprises:
a water insoluble organic complexing agent dissolved in a water insoluble polar organic solvent wherein the polar character of the solvent ensures low resistivity of the separator enabling the required current demand of the electrochemical cell.

3. The separator of claim 2 wherein said polar organic solvent is selected from the group consisting of hexanol, heptanol, n-octanol, n-decanol, cyclohexanol, phenethyl alcohol, benzyl alcohol and mixtures thereof.

4. The separator of claim 1 wherein the membrane has an overall porosity between about 30 to about 65 percent.

5. The separator of claim 4 wherein the membrane has a thickness from about 1 to about 3 mils.

6. The separator of claim 5 wherein the saturated membrane has a resistivity of less than about 100 ohm-$cm^2$.

7. The separator of claim 4 wherein the saturated membrane has a resistivity of less than about 10 ohm-$cm^2$.

8. A supported liquid membrane comprising a hydrophobic microporous membrane having a thickness between about 0.5 and 25 mils, whose pores support a mixture of a water insoluble organic complexing agent dissolved in a organic solvent therefore, wherein the mixture, which is substantially insoluble in the electrochemical electrolyte solution, selectively transports specific cation and anion species through said membrane.

9. The supported liquid membrane of claim 8 wherein the solvent is a mixture of a polar organic solvent and a hydrocarbon solvent.

10. The supported liquid membrane of claim 8 wherein the polar organic solvent is selected from the group consisting of cyclohexanol, hexanol, benzyl alcohol, decanol, phenethyl alcohol and mixtures thereof.

11. In an alkaline battery comprising at least one pair of a positive electrode and a negative electrode the improvement comprising a hydrophobic microporous membrane which supports within its porous matrix a liquid ionic transport agent interposed between the negative and the positive electrode, said agent which is substantially insoluble in the electrochemical electrolyte solution and consisting essentially of an organic ion transport agent in a polar organic solvent therefore, such that the electrolyte insoluble agent selectively transports specific cation and anion species through the microporous membrane.

* * * * *